March 24, 1953  J. L. BOYER ET AL  2,632,870
VAPOR ELECTRIC DEVICE
Filed July 22, 1950

WITNESSES:
E. A. McCloskey
Wm. L. Groome

INVENTORS
John L. Boyer and
Lee A. Kilgore.
BY
S. A. Strickler
ATTORNEY

Patented Mar. 24, 1953

2,632,870

UNITED STATES PATENT OFFICE 2,632,870

VAPOR ELECTRIC DEVICE

John L. Boyer, Pittsburgh, and Lee A. Kilgore, Export, Pa., assignors to Westinghouse Electric Corporation, East Pittsburgh, Pa., a corporation of Pennsylvania Application July 22, 1950, Serial No. 175,328

12 Claims. (Cl. 315—201)

Our invention relates to a vapor-electric device and particularly to an improved control system for a make-alive type converter.

In the operation of make-alive type devices, it is desirable to periodically apply current impulses to initiate the successive current carrying periods in the device. These current impulses are of short duration but of relatively high momentary energy content. Because of the relatively high instantaneous energy content, it is desirable to utilize energy storing devices and store the energy over a relatively long period of time and then rapidly discharge the energy during the cathode spot initiating interval. This long storage rapid discharge has the advantage that relatively light and inexpensive transformers and current conductors may be utilized for the major portion of the exciting system. Also the long charging interval produces a substantially smooth or constant transfer of energy thus preserving the normal wave form of current drawn from the control energy source.

It has heretofore been proposed to utilize saturable transformers for applying the periodic cathode spot initiating impulses. However, as heretofore used, there has been no possibility of taking advantage of energy storage and it has been necessary to build a transformer capable of delivering the full instantaneous energy impulse.

According to our invention, we provide a system in which a saturable transformer is utilized during its non-saturated condition to transfer over a relatively long interval of time a quantity of energy to an energy storing device such as a capacitor. Later, when the saturable transformer is saturated, it permits or causes the capacitor to rapidly discharge its energy to a make-alive or impulse circuit.

It is accordingly an object of our invention to provide a system utilizing a saturable transformer to supply energy in its unsaturated condition and to permit discharge of the energy during its saturated condition.

It is a further object of our invention to provide an excitation system utilizing a saturable transformer as a control.

Figure 1:
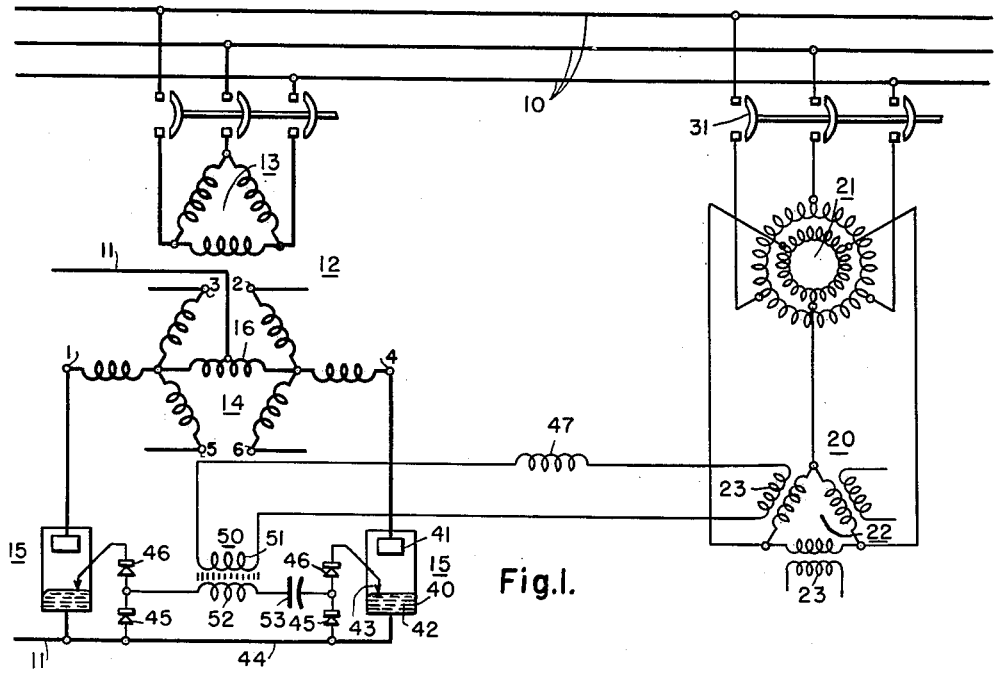
Figure 2:
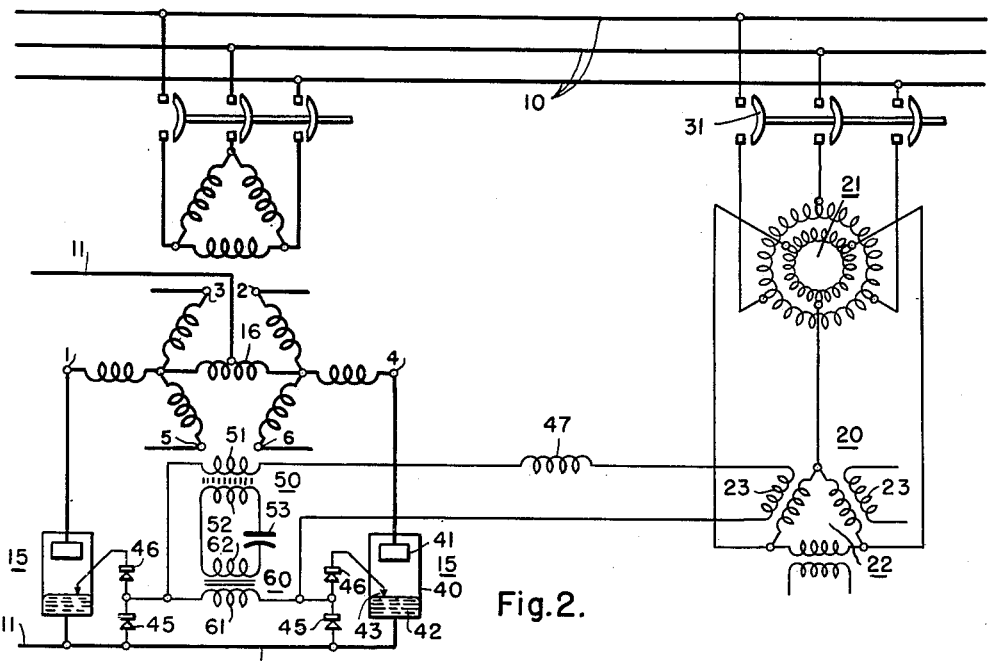

Other objects and advantages of our invention will be apparent from the following detailed description taken in conjunction with the accompanying drawing, in which:

Figure 1 is a schematic illustration of a vapor-electric device utilizing a simplified embodiment of our invention; and Fig. 2 is a similar illustration disclosing an improved system according to our invention.

In the exemplary embodiment of our invention, an alternating-current circuit 10 is connected to a load circuit 11 by a vapor-electric converter comprising a converter transformer 12 having a polygon winding herein illustrated as a delta-winding 13 connected to the alternating-current circuit 10 and a double-star star-connected winding 14 having its phase terminals 1 to 6 connected to pairs of alternately conducting make-alive type vapor-electric valves 15 and having means such as an interphase transformer 16 for controlling the voltage of the star points of the double-star star-connected winding 14.

For simplicity of illustration, we have shown only a pair of alternately conductive valves 15 although it will be apparent that there are in actual fact a plurality of such pairs of valves 15.

A source of alternating-current control potential, preferably of the same frequency and phase relation as the alternating-current 10 may conveniently be a transformer 20 energized, if desired, through a phase-shifting device 21 and a control switching device 31 from the alternating-current circuit 10 itself. The control transformer 20 preferably includes a polygon connected primary winding 22 and a plurality of substantially independent secondary windings 23, there being one of the secondary windings 27 for each pair of alternately conducting valves 15.

The make-alive type devices 15 themselves comprise a suitable container 40 which is usually evacuated and contains a main anode 41, each of the main anodes 41 being connected to a corresponding phase terminal 1 to 6 of the converter transformer 12. Cooperating with the anodes 41 is a vaporizable reconstructing cathode 42 of such material as mercury, gallium, caesium, potassium, etc.

The excitation means for each of the valves 15 comprises an igniter or make-alive electrode 43 in contact with the material of the cathode 42 and preferably partially immersed therein. The control impulses are provided from the secondary windings 23 by means of a saturable transformer 50 having a primary winding 51 connected in energy receiving relation to the secondary winding 23 of the control transformer 20. While the saturable transformer 50 is unsaturated, the primary winding 51 delivers energy to a secondary winding 52 which, in turn, is connected in series with an energy storing device such as a capacitor 53. During the energy storing interval, the saturable transformer 50 directly couples the energy storing device 53 to the source 20 of energy and because of the slow charging rate, the charging current which necessarily flows through one or the other of the make-alive electrodes 43 will not be of sufficient intensity to initiate a cathode spot. However, when the saturable transformer 50 becomes saturated, preferably at substantially the peak of the control potential, the impedance of the saturable transformer 50 will be suddenly reduced and the capacitor 53 will rapidly discharge through a discharge circuit comprising the secondary winding 52 of the saturable transformer 50, one of the make-alive electrodes 43, common cathode connection 44 of the vapor-electric device and inversely through the alternate make-alive electrode 43 back to the storage device 53.

Because the passage of inverse current through the make-alive electrodes 43 is believed to have deleterious effects on the life of the make-alive electrodes 43 and certainly produces undesirable heating effects therein, we prefer to provide inverse current shunts 45 in parallel with the make-alive electrodes 43 so that on the discharge of the energy storing device 53 one of the make-alive electrodes 43 will be energized and the other one will be shunted depending upon the polarity of the charge on the energy storing device 53.

Obviously, since the control potential is of an alternating-current nature first one and then the other of the make-alive electrodes 43 will be energized from the energy storing device 53. If desired, inverse current may be completely eliminated from the make-alive electrodes 43 by providing a series connected polarity responsive device 46 such as a unidirectional conductor in series with each of the make-alive electrodes 43. Likewise, the inverse current shunts 45 may conveniently be unidirectional conducting devices, preferably all of these unidirectional conducting devices are of the so-called dry rectifier type.

In the modification according to Fig. 2, we have provided a system which substantially eliminates the flow of charging current through the make-alive electrodes 43 and thus completely eliminates the undesirable heating effect and any possibility of accidental premature initiation of a cathode spot.

The charging-and-discharging circuit of the energy storing device 53 of Fig. 2 is as before connected to the energy-source 20 through the primary 51 and the secondary winding 52 of a saturable transformer 50, while this charging-and-discharging circuit is connected to the cathode-spot-initiating electrodes 43 through a non-saturable transformer 60. The saturable transformer 50 of Fig. 2 is connected similarly to Fig. 1, but the secondary winding 61 of the non-saturating transformer 60 is connected in series with the primary winding 51 of the saturable transformer 50 so that the primary current of the saturable transformer 50 flows also through the secondary winding 61 of the non-saturable transformer 60 and back to the control potential source 20. The primary 62 and secondary winding 61 of the non-saturable transformer 60 are so wound that the flux produced by the flow of charging or primary current in the secondary winding 61 of the non-saturable transformer 60 produces a flux which is opposite in direction to the flux produced by the charging current flowing from the secondary winding 52 of the saturable transformer 50 to the energy storing device 53 so that the resultant flux of the non-saturating transformer 60 during the charging interval or the interval when the saturable transformer 50 is unsaturated is substantially zero and consequently no voltage will be generated in the unsaturable transformer 60 and no current will flow in the make-alive electrode circuits.

At the interval when the saturable transformer 50 becomes saturated, in Fig. 2, the current in the energy storing circuit will be reversed so that any current which continues to flow in the series circuit including the primary winding 51 and the secondary winding 61 will tend to produce a flux in the same direction as the flux flowing as the result of the discharge circuit and, in effect, tends to reduce the impedance of the transformer 60 so that the current more readily flows from the storage device 53 through the make-alive electrodes 43.

In order to prevent a sudden rush of current from the source 20 of control potential, in either form of embodiment of our invention, we prefer to provide an impedance 47, preferably of the reactive type, between the source 20 of control potential and the primary winding 51 of the saturable transformer 50.

In either modification, the saturable transformer 50 serves both as a means for transferring charging current to the energy storing device 53 and also as a tripping or valve device for permitting or causing rapid discharge of the storage device 53 to the make-alive electrodes 43 which will be activated in response to the polarity of the energy storing device 53 and since the impulses received are substantially 180 electrical degrees apart, the impulses or cathode spot initiating intervals will be substantially 180 electrical degrees apart so that the vapor-electric valves 15 will be operative 180 electrical degrees apart as is required by the winding arrangement of the converter transformer 12.

We claim as our invention:

1. In combination, two ignitrons each having an ignitor, a common cathode-circuit, and firing-means for effectively exciting the two ignitors alternately at substantially 180° intervals, said firing-means being characterized by including an exciting source of alternating-current exciting-potential, an energy-storing capacitor, polarity-responsive means associated with each ignitor for ensuring that each ignitor receives excitation-current in the proper polarity and for by-passing current of the opposite polarity from that ignitor, a saturable inductance device, a series impedance device, and circuit-connections for serially connecting said capacitor in a charging-and-discharging circuit between said exciting-source and the two ignitors, with the respective ignitors connected to opposite terminals of the capacitor, with the saturable inductance device connected in series-circuit relation with respect to said charging-and-discharging circuit, and with the series impedance device connected in series between the capacitor and the exciting-source, said circuit-connections causing the capacitor to charge slowly during each half-cycle of the exciting-source potential, while the saturable inductance-device is unsaturated, and causing the capacitor to discharge rapidly in the opposite direction, thereby sending a discharge-current through the appropriate ignitor, when the saturable inductance-device saturates during each half-cycle of the exciting-source potential.

2. In combination, two ignitrons each having an ignitor, a common cathode-circuit, and firing-means for effectively exciting the two ignitors alternately at substantially 180° intervals, said firing-means being characterized by including an exciting-source of alternating-current exciting-potential, an energy-storing capacitor, polarity-responsive means associated with each ignitor for ensuring that each ignitor receives excitation-current in the proper polarity and for bypassing current of the opposite polarity from that ignitor, a saturable transformer having primary and secondary windings, a series impedance device, circuit-connections including said series impedance device for energizing the primary winding of said saturable transformer from the exciting-source, and other circuit-connections for energizing said capacitor in series circuit relation with respect to the secondary winding of said saturable transformer, and for causing the respective ignitors to be connected to receive their excitations from the opposite terminals of the capacitor.

3. In combination, two ignitrons each having an ignitor, a common cathode-circuit, and firing-means for effectively exciting the two ignitors alternately at substantially 180° intervals, said firing-means being characterized by including an exciting-source of alternating-current exciting-potential, an energy-storing capacitor, polarity-responsive means associated with each ignitor for ensuring that each ignitor receives excitation-current in the proper polarity and for bypassing current of the opposite polarity from that ignitor, a saturable inductance device, a series impedance device, circuit-connections including said series impedance device for energizing said saturable inductance device from the exciting-source, and other circuit-connections for connecting one capacitor-terminal to one terminal of the saturable inductance device, and for connecting the two ignitors respectively to the other capacitor-terminal and another terminal of the saturable inductance device.

4. In combination, two ignitrons each having an ignitor, a common cathode-circuit, and firing-means for effectively exciting the two ignitors alternately at substantially 180° intervals, said firing-means being characterized by including an exciting-source of alternating current exciting-potential, an energy-storing capacitor, polarity-responsive means associated with each ignitor for ensuring that each ignitor receives excitation-current in the proper polarity and for bypassing current of the opposite polarity from that ignitor, a saturable transformer having primary and secondary windings, a series impedance device, circuit-connections including said series impedance device for energizing the primary winding of said saturable transformer from the exciting-source, and other circuit-connections for connecting one capacitor-terminal to one terminal of the secondary winding of the saturable transformer, and for connecting the two ignitors respectively to the other capacitor-terminal and the other terminal of said secondary winding.

5. In combination, two ignitrons each having an ignitor, a common cathode-circuit, and firing-means for effectively exciting the two ignitors alternately at substantially 180° intervals, said firing-means being characterized by including an exciting-source of alternating-current exciting-potential, an energy-storing capacitor, polarity-responsive means associated with each ignitor for ensuring that each ignitor receives excitation-current in the proper polarity and for bypassing current of the opposite polarity from that ignitor, a saturable inductance device, a non-saturable inductance device, a series impedance device, circuit-connections including said series impedance device for energizing said saturable inductance device from the exciting-source, other circuit-connections for connecting said capacitor in a closed circuit between said saturable and non-saturable inductance devices, and still other circuit-connections for connecting the respective ignitors to opposite terminals of the non-saturable inductance device.

6. In combination, two ignitrons each having an ignitor, a common cathode-circuit, and firing-means for effectively exciting the two ignitors alternately at substantially 180° intervals, said firing-means being characterized by including an exciting-source of alternating-current exciting-potential, an energy-storing capacitor, polarity-responsive means associated with each ignitor for ensuring that each ignitor receives excitation-current in the proper polarity and for bypassing current of the opposite polarity from that ignitor, a saturable transformer having primary and secondary windings, a non-saturable transformer having primary and secondary windings, a series impedance device, circuit-connections including said series impedance device for energizing the primary winding of said saturable transformer from the exciting-source, other circuit-connections for connecting said capacitor in a closed circuit between the secondary winding of said saturable transformer and the primary winding of said non-saturable transformer, and still other circuit-connections for connecting the respective ignitors to opposite terminals of the secondary winding of the non-saturable transformer.

7. The combination with an ignitron having an ignitor, of a firing-means characterized by including an exciting-source of alternating-current exciting-potential, an energy-storing capacitor, polarity-responsive means associated with said ignitor for ensuring that it receives excitation-current in the proper polarity and for bypassing current of the opposite polarity, a saturable inductance device, a series impedance device, and circuit-connections for serially connecting said capacitor in a charging-and-discharging circuit between said exciting-source and the ignitor, with the saturable inductance device connected in series-circuit relation with respect to said charging-and-discharging circuit, and with the series impedance device connected in series between the capacitor and the exciting-source, said circuit-connections causing the capacitor to charge slowly during each half-cycle of the exciting-source potential, while the saturable inductance-device is unsaturated, and causing the capacitor to discharge rapidly in the opposite direction, thereby sending a discharge-current through the ignitor, when the saturable inductance-device saturates during the appropriate half-cycle of the exciting-source potential.

8. The combination with an ignitron having an ignitor, of a firing-means characterized by including an exciting-source of alternating-current exciting-potential, an energy-storing capacitor, polarity-responsive means associated with said ignitor for ensuring that it receives excitation-current in the proper polarity and for bypassing current of the opposite polarity, a saturable transformer having primary and secondary windings, a series impedance device, circuit-connections including said series impedance device for energizing the primary winding of said saturable transformer from the exciting-source, and other circuit-connections for energizing said capacitor in series circuit relation with respect to the secondary winding of said saturable transformer, and for causing the ignitor to be excited from the capacitor.

9. The combination with an ignitron having an ignitor, of a firing-means characterized by including an exciting-source of alternating-current exciting-potential, an energy-storing capacitor, polarity-responsive means associated with said ignitor for ensuring that it receives excitation-current in the proper polarity and for bypassing current of the opposite polarity, a saturable inductance device, a series impedance device, circuit-connections including said series impedance device for energizing said saturable inductance device from the exciting-source, and other circuit-connections for connecting one capacitor-terminal to one terminal of the saturable inductance device, and for providing an ignitor-exciting circuit connected to the other capacitor-terminal and another terminal of the saturable inductance device.

10. The combination with an ignitron having an ignitor, of a firing-means characterized by including an exciting-source of alternating-current exciting-potential, an energy-storing capacitor, polarity-responsive means associated with said ignitor for ensuring that it receives excitation-current in the proper polarity and for bypassing current of the opposite polarity, a saturable transformer having primary and secondary windings, a series impedance device, circuit-connections including said series impedance device for energizing the primary winding of said saturable transformer from the exciting-source, and other circuit-connections for connecting one capacitor-terminal to one terminal of the secondary winding of the saturable transformer, and for providing an ignitor-exciting circuit connected to the other capacitor-terminal and the other terminal of said secondary winding.

11. The combination with an ignitron having an ignitor, of a firing-means characterized by including an exciting-source of alternating-current exciting-potential, an energy-storing capacitor, polarity-responsive means associated with said ignitor for ensuring that it receives excitation-current in the proper polarity and for bypassing current of the opposite polarity, a saturable inductance device, a non-saturable inductance device, a series impedance device, circuit-connections including said series impedance device for energizing said saturable inductance device from the exciting-source, other circuit-connections for connecting said capacitor in a closed circuit between said saturable and non-saturable inductance devices, and still other circuit-connections for providing an ignitor-exciting circuit connected to opposite terminals of the non-saturable inductance device.

12. The combination with an ignitron having an ignitor, of a firing-means characterized by including an exciting-source of alternating-current exciting-potential, an energy-storing capacitor, polarity-responsive means associated with said ignitor for ensuring that it receives excitation-current in the proper polarity and for bypassing current of the opposite polarity, a saturable transformer having primary and secondary windings, a non-saturable transformer having primary and secondary windings, a series impedance device, circuit-connections including said series impedance device for energizing the primary winding of said saturable transformer from the exciting-source, other circuit-connections for connecting said capacitor in a closed circuit between the secondary winding of said saturable transformer and the primary winding of said non-saturable transformer, and still other circuit-connections for providing an ignitor-exciting circuit connected to opposite terminals of the secondary winding of the non-saturable transformer.

JOHN L. BOYER.
LEE A. KILGORE.

REFERENCES CITED

The following references are of record in the file of this patent:

UNITED STATES PATENTS

| Number | Name | Date |
|---|---|---|
| 2,266,714 | Mittag | Dec. 16, 1941 |
| 2,291,092 | Cox et al. | July 28, 1942 |
| 2,387,946 | Rose et al. | Oct. 30, 1945 |
| 2,436,324 | Pakala et al. | Feb. 17, 1948 |

FOREIGN PATENTS

| Number | Country | Date |
|---|---|---|
| 551,562 | Great Britain | Mar. 1, 1943 |